United States Patent
Lin

(10) Patent No.: US 12,004,014 B2
(45) Date of Patent: Jun. 4, 2024

(54) WIRELESS COMMUNICATION METHOD AND COMMUNICATION DEVICE

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 560 days.

(21) Appl. No.: 17/174,279

(22) Filed: Feb. 11, 2021

(65) Prior Publication Data

US 2021/0168663 A1  Jun. 3, 2021

Related U.S. Application Data

(63) Continuation of application No. PCT/CN2018/101189, filed on Aug. 17, 2018.

(51) Int. Cl.
*H04W 28/24* (2009.01)
*H04L 1/08* (2006.01)
(Continued)

(52) U.S. Cl.
CPC .............. *H04W 28/24* (2013.01); *H04L 1/08* (2013.01); *H04L 5/0055* (2013.01); *H04W 16/14* (2013.01); *H04W 72/0453* (2013.01)

(58) Field of Classification Search
CPC . H04W 28/24; H04W 16/14; H04W 72/0453; H04L 1/08
See application file for complete search history.

(56) References Cited

U.S. PATENT DOCUMENTS 10,735,170 B2 *  8/2020  Yang .................. H04L 5/0048
10,784,987 B2 *  9/2020  Marinier ............. H04L 1/1896
(Continued)

FOREIGN PATENT DOCUMENTS

CN       101860911 A    10/2010
CN       103944694 A    7/2014
(Continued)

OTHER PUBLICATIONS

Guangdong OPPO Mobile Telecommunications Corp., Ltd., EP18930326.6, First Office Action, Apr. 5, 2023, 6 pgs.
(Continued)

*Primary Examiner* — Michael J Moore, Jr.
(74) *Attorney, Agent, or Firm* — Morgan, Lewis & Bockius LLP

(57) ABSTRACT

Embodiments of the present application provide a wireless communication method and a communication device. The method includes: transmitting, by a terminal device, uplink data at least one time, and for each transmission of the uplink data among at least one transmission of the uplink data, transmitting transmission information for each transmission of the uplink data, wherein the transmission information for each transmission of the uplink data comprises at least one of the following: a serial number of each transmission of the uplink data, a total number of times for transmitting the uplink data, and a number of times the uplink data has currently been transmitted among at least one transmission of the uplink data.

18 Claims, 12 Drawing Sheets

(51) Int. Cl.
*H04L 5/00* (2006.01)
*H04W 16/14* (2009.01)
*H04W 72/0453* (2023.01)

(56) References Cited

U.S. PATENT DOCUMENTS

| | | | |
|---|---|---|---|
| 11,528,096 B2* | 12/2022 | Kitamura | H04W 28/04 |
| 2010/0031110 A1 | 2/2010 | Seok et al. | |
| 2018/0324816 A1* | 11/2018 | Islam | H04L 5/0053 |
| 2019/0342911 A1* | 11/2019 | Talarico | H04L 1/1614 |
| 2019/0363833 A1* | 11/2019 | Wang | H04L 1/1819 |
| 2020/0052812 A1* | 2/2020 | Kittichokechai | H04L 1/0003 |
| 2020/0374933 A1* | 11/2020 | Lou | H04W 74/0808 |
| 2020/0383132 A1* | 12/2020 | Yang | H04W 74/0808 |
| 2021/0044392 A1* | 2/2021 | Myung | H04L 1/1864 |
| 2021/0112421 A1* | 4/2021 | Tang | H04L 5/0051 |
| 2021/0168641 A1* | 6/2021 | Frenne | H04L 1/0026 |
| 2021/0168663 A1* | 6/2021 | Lin | H04W 28/24 |
| 2021/0344445 A1* | 11/2021 | Lin | H04L 1/1642 |
| 2021/0360638 A1* | 11/2021 | Lin | H04W 72/21 |
| 2022/0116152 A1* | 4/2022 | Iyer | H04L 1/188 |
| 2023/0142830 A1* | 5/2023 | Myung | H04W 72/21 370/329 |

FOREIGN PATENT DOCUMENTS

| | | |
|---|---|---|
| CN | 106411475 A | 2/2017 |
| CN | 106411477 A | 2/2017 |
| CN | 107079335 A | 8/2017 |
| CN | 108023706 A | 5/2018 |
| JP | 2016072979 A | 5/2016 |
| WO | WO2018126857 A1 | 12/2017 |
| WO | WO2020/034220 A1 | 2/2020 |

OTHER PUBLICATIONS

Guangdong OPPO Mobile Telecommunications Corp., Ltd., JP2021-507486, Decision of Rejection, Apr. 24, 2023, 6 pgs.
Guangdong OPPO Mobile Telecommunications Corp., Ltd., International Search Report and Written Opinion, PCT/CN2018/101189, May 15, 2019, 11 pgs.
Guangdong OPPO Mobile Telecommunications Corp., Ltd., Extended European Search Report, EP18930326.6, Nov. 29, 2021, 8 pgs.
Examination Report, IN202127007118, Sep. 15, 2021, 6 pgs.
InterDigital Inc., "Discussion on Configured Grants in NR-Unlicensed, 3GPP TSG RAN WG1 Meeting #93, R1-1807039, Busan, Korea, May 21-25, 2018, 4 pgs.
Guangdong OPPO Mobile Telecommunications Corp., Ltd., JP2021507486, First Office Action, Oct. 21, 2022, 10 pgs.
Convida Wireless, "Autonomous Uplink Transmission in NR Unlicensed", 3GPP TSG-RAN WG1 Meeting #94, R1-1809382, Gothenburg, Sweden, Aug. 20-24, 2018, 5 pgs.
InterDigital Inc., "Discussion on HARQ Procedure in NR-Unlicensed", 3GPP TSG RAN WG1 Meeting #93, R1-1807038, Busan, Korea, May 21-25, 2018, 3 pgs.
OPPO, "HARQ enhancements for NR-U", 3GPP TSG RAN WG1 Meeting #94, R1-1808895, Gothenburg, Sweden, Aug. 20-24, 2018, 4 pgs.
OPPO, "Configured grant transmission on NR-U", 3GPP TSG RAN WG1 Meeting #94, R1-1808901, Gothenburg, Sweden, Aug. 20-24, 2018, 2 pgs.
Nokia, Nokia Shanghai Bell, "HARQ operation on NR unlicensed", 3GPP TSG RAN WG1 Meeting #94, R1-1808820, Gothenburg, Sweden, Aug. 20-24, 2018, 5 pgs.
OPPO, "Considerations on configured grant for NR-U", 3GPP TSG RAN WG1 Meeting #94bis, R1-1810961, Chengdu, China, Oct. 8-12, 2018, 4 pgs.
Guangdong OPPO Mobile Telecommunications Corp., Ltd., TW108129379, First Office Action, Nov. 9, 2022, pgs.
Guangdong OPPO Mobile Telecommunications Corp., Ltd., JP2021-507486, Reconsideration Examination Report, Oct. 17, 2023, 8 pgs.
Guangdong OPPO Mobile Telecommunications Corp., Ltd., JP2021-507486, Notice of Termination of Reconsideration by Examiners before Appeal Proceedings, Oct. 17, 2023, 2 pgs.
Guangdong OPPO Mobile Telecommunications Corp., Ltd., IN202127007118, Hearing Notice, Feb. 3, 2024, 2 pgs.
Guangdong OPPO Mobile Telecommunications Corp., Ltd., JP2021-507486, Notice of Allowance, Mar. 1, 2024, 5 pgs.

* cited by examiner

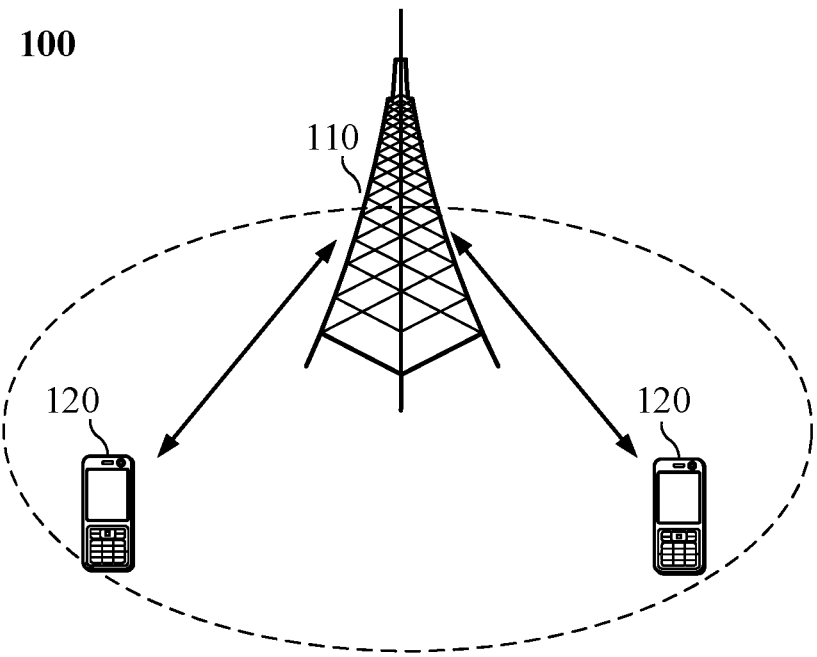

Transmit, by a terminal device, uplink data at least one time, and for each transmission of the uplink data among at least one transmission of the uplink data, transmit transmission information for each transmission of the uplink data, wherein the transmission information for each transmission of the uplink data includes at least one of the following: a serial number of each transmission of the uplink data, a total number of times for transmitting the uplink data, and a number of times the uplink data has currently been transmitted among at least one transmission of the uplink data ⟋ 210

Receive, by a network device, uplink data sent from a terminal device at least one time, and transmission information for each transmission of the uplink data sent from the terminal device for each transmission of the uplink data among at least one transmission of the uplink data, wherein the transmission information for each transmission of the uplink data includes at least one of the following: a serial number of each transmission of the uplink data, a total number of times for transmitting the uplink data, and a number of times the uplink data has currently been transmitted ⟶ 310

Based on the transmission information for each transmission of the uplink data, send, by the network device, feedback information for the uplink data to the terminal device ⟶ 320

FIG. 3

WIRELESS COMMUNICATION METHOD AND COMMUNICATION DEVICE

CROSS REFERENCE TO RELATION APPLICATION

This application is a continuation application of PCT Patent Application No. PCT/CN2018/101189, entitled "WIRELESS COMMUNICATION METHOD AND COMMUNICATION DEVICE" filed on Aug. 17, 2018, which is incorporated herein by reference in its entirety.

TECHNICAL FIELD

Embodiments of the present disclosure generally relate to communication technologies, and more particularly, to a wireless communication method and a communication device.

BACKGROUND

In the Long Term Evolution (LTE) system, a network device performs scheduling of uplink data for a terminal device, and the terminal device sends uplink data to the network device. The network device can send feedback information to the terminal device depending on whether the uplink data is successfully received.

New Radio (NR) has higher requirements for system performance.

How to improve communication performance in NR feedback is an urgent problem to be solved.

SUMMARY

Embodiments of the present disclosure provide a wireless communication method and device, which can improve communication performance in terms of feedback for uplink data.

According to a first aspect, there is provided a wireless communication method, including:

transmitting, by a terminal device, uplink data at least one time, and for each transmission of the uplink data among at least one transmission of the uplink data, transmitting transmission information for each transmission of the uplink data, wherein the transmission information for each transmission of the uplink data includes at least one of the following:

a serial number of each transmission of the uplink data, a total number of times for transmitting the uplink data, and a number of times the uplink data has currently been transmitted among at least one transmission of the uplink data.

According to a second aspect, there is provided wireless communication method, including:

receiving, by a network device, uplink data sent from a terminal device at least one time, and transmission information for each transmission of the uplink data sent from the terminal device for each transmission of the uplink data among at least one transmission of the uplink data, wherein the transmission information for each transmission of the uplink data includes at least one of the following:

a serial number of each transmission of the uplink data, a total number of times for transmitting the uplink data, and a number of times the uplink data has currently been transmitted; and based on the transmission information for each transmission of the uplink data, sending, by the network device, feedback information for the uplink data to the terminal device.

According to a third aspect, there is provided a terminal device configured to perform the method according to the first aspect.

Specifically, the terminal device includes functional modules configured to perform the method according to the first aspect.

According to a fourth aspect, there is provided a network device configured to perform the method according to the second aspect.

Specifically, the network device includes functional modules configured to perform the method according to the second aspect.

According to a fifth aspect, there is provided a terminal device, including a processor and a memory. The memory is configured to store a computer program, and the processor is configured to call and run the computer program stored in the memory to perform the method according to the first aspect.

According to a sixth aspect, there is provided a network device, including a processor and a memory. The memory is configured to store a computer program, and the processor is configured to call and run the computer program stored in the memory to perform the method according to the second aspect.

According to a seventh aspect, there is provided a chip configured to implement the method according to any one of the first to second aspects.

Specifically, the chip includes a processor configured to call and run a computer program stored in a memory to cause a device in which the chip is installed to perform the method according to any one of the first to second aspects.

According to an eighth aspect, there is provided a computer-readable storage medium configured to store a computer program, wherein the computer program is configured to cause a computer to perform the method according to any one of the first to second aspects.

According to a ninth aspect, there is provided a computer program product including computer program instructions that cause a computer to perform the method according to any one of the first to second aspects.

According to a tenth aspect, there is provided a computer program. When the computer program is run on a computer, the computer is caused to perform the method according to any one of the first to second aspects.

In embodiments of the present disclosure, when the terminal device sends uplink data, at least one of the serial number of each transmission of the uplink data, a total number of times for transmitting the uplink data, and a number of times the uplink data has currently been transmitted is sent, so as to better provide feedback information, and accordingly improve communication performance.

BRIEF DESCRIPTION OF THE DRAWINGS

FIG. 1 is a schematic diagram of communication system architecture according to an embodiment of the present disclosure.

FIG. 2 is a schematic diagram of a wireless communication method according to an embodiment of the present disclosure.

FIG. 3 is a schematic diagram of a wireless communication method according to an embodiment of the present disclosure.

DETAILED DESCRIPTION

Figure 4:
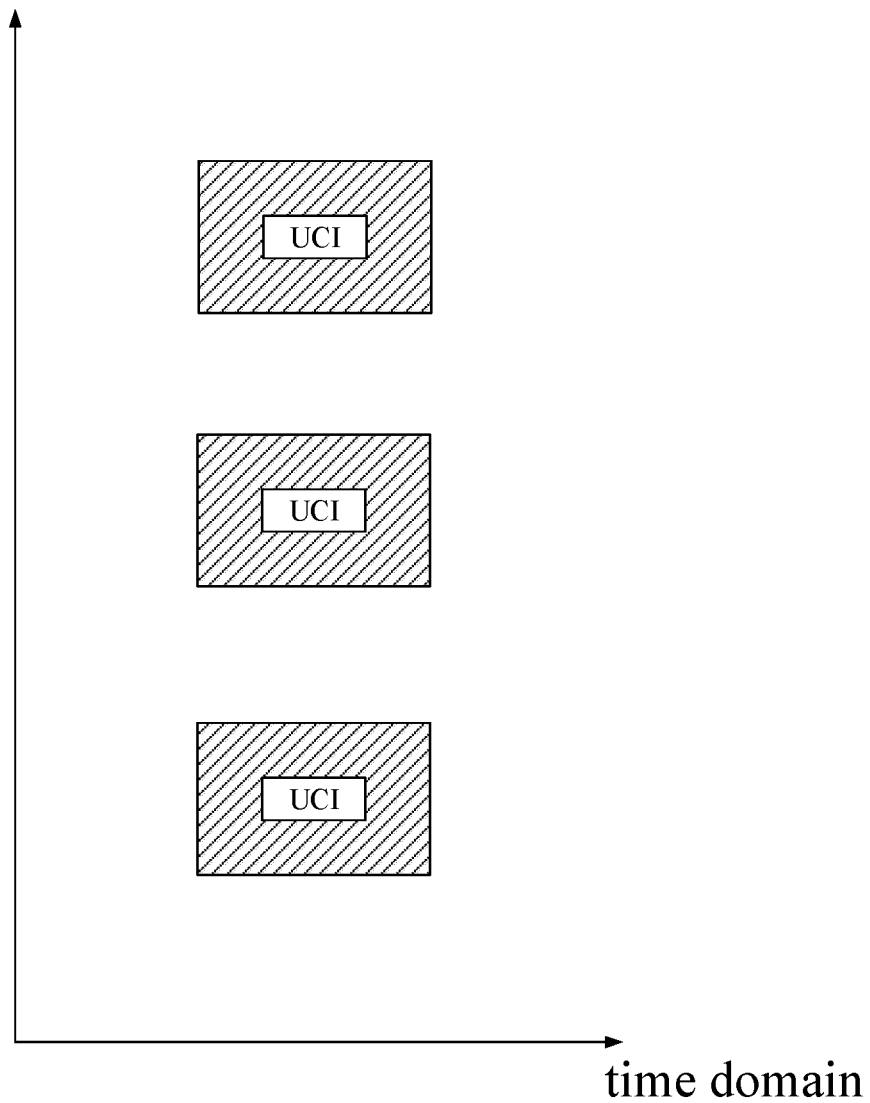
FIG. 4 is a schematic diagram showing sending of uplink data transmission information according to an embodiment of the present disclosure.

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM A broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable devices, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" herein describes an association relationship between associated objects, which means that there can be three relationships, for example, "A and/or B" can mean: A exists only, both A and B exist, B exists only. In addition, the character "/" herein generally indicates that the associated objects before and after "/" are in an "or" relationship.

Embodiments of the present disclosure can be applied in communication procedures in unlicensed spectrum. The unlicensed spectrum is the spectrum that can be used for radio equipment communication divided by countries and regions. This spectrum can be considered as a shared spectrum, that is, communication equipment in different communication systems that meets regulatory requirements set by countries or regions on the spectrum can use the spectrum, and it is not necessary to apply for a specialized spectrum authorization from governments. In order to allow various communication systems that use unlicensed spectrum for wireless communications to coexist friendly on the spectrum, some countries or regions have stipulated regulatory requirements that must be met to use unlicensed spectrum. For example, in some regions, a communication device follows a principle of "listen before talk", that is, the communication device needs to perform channel listening or sensing before transmitting signals on a channel of unlicensed spectrum; only when the channel listening result is that the channel is idle, the communication device can perform signal transmission; if the channel listening result of the communication device on the channel of the unlicensed spectrum is that the channel is busy, the communication device cannot perform signal transmission. For another example, in order to ensure fairness, in one transmission, the duration for a communication device to use a channel of the unlicensed spectrum to transmit signals cannot exceed the Maximum Channel Occupation Time (MCOT). For another example, in order to avoid causing sub-band interference to signals transmitted on a channel of the unlicensed spectrum, and to improve the detection accuracy for the communication device to detect the channel of the unlicensed spectrum, the bandwidth of signals transmitted on the channel of the unlicensed spectrum needs to use at least a certain percentage of the channel bandwidth. For another example, in order to avoid that the power of signals transmitted on the channel of the unlicensed spectrum is too large, which may affect the transmission of other important signals on the channel, such as radar signals or the like, a communication device needs to meet the requirement that the power of the signals do not exceed the maximum power spectral density when using the channel of the unlicensed spectrum for signal transmission.

On the unlicensed spectrum, a network device can semi-statically configure periodic uplink resources for a terminal device in advance, and use dynamic signaling to activate and deactivate the semi-statically configured uplink resources. During the period when a semi-statically configured uplink resource is activated, the terminal device may perform PUSCH transmission on the uplink resource spontaneously when there is an uplink data transmission demand. After receiving the PUSCH transmission, the network device may perform a Hybrid Automatic Repeat reQuest (HARD) feedback for the PUSCH.

On the unlicensed spectrum, the terminal device performs uplink transmission on periodic uplink resources, and the terminal device can perform channel listening first, and in the case of successful channel listening, the terminal device sends the uplink data at least one time on the unlicensed frequency band.

It should be understood that the resource for the terminal device to listen on the unlicensed spectrum may not be a periodic uplink resource. For example, the terminal device may perform channel listening after receiving the scheduling from the network device.

It should also be understood that embodiments of the present disclosure may not be applied in unlicensed spectrum.

FIG. 2 is a schematic flowchart of a wireless communication method 200 according to an embodiment of the present disclosure. The method 200 includes at least part of the following contents.

In 210, a terminal device transmits uplink data at least one time, and for each transmission of the uplink data among at least one transmission of the uplink data, the terminal device transmits transmission information for each transmission of the uplink data. The transmission information for each transmission of the uplink data includes at least one of the following:

a serial number of each transmission of the uplink data, a total number of times for transmitting the uplink data, and a number of times the uplink data has currently been transmitted among at least one transmission of the uplink data.

Further, after sending the uplink data at least one time and the transmission information for the uplink data, the terminal device can receive feedback information from the network device for the uplink data. For example, the terminal device can obtain the feedback information according to the serial number of the transmission of the uplink data and/or the total number of transmissions of the uplink data. Accordingly, the terminal device can perform subsequent operations (for example, determine whether to retransmit the uplink data) based on the feedback information for the uplink data.

FIG. 3 is a schematic flowchart of a wireless communication method 300 according to an embodiment of the present disclosure. The method 300 includes at least part of the following contents.

In 310, a network device receives uplink data sent from a terminal device at least one time, and transmission information for each transmission of the uplink data sent from the terminal device for each transmission of the uplink data among at least one transmission of the uplink data. The transmission information for each transmission of the uplink data includes at least one of the following:

a serial number of each transmission of the uplink data, a total number of times for transmitting the uplink data, and a number of times the uplink data has currently been transmitted.

In 320, based on the transmission information for each transmission of the uplink data, the network device sends feedback information for the uplink data to the terminal device.

In embodiments of the present disclosure, the terminal device can perform channel listening on an unlicensed frequency band, and in the case of a successful channel listening, the terminal device can send uplink data at least one time and transmission information for the uplink data.

The network device can detect the uplink data sent by the terminal device on the unlicensed frequency band, and after detecting the uplink data, the network device can send feedback information to the terminal device. When sending the feedback information, the network device can perform channel listening within a time window for receiving uplink data; if the channel listening is successful, the network device can send the feedback information within the time window; if the channel listening in the window is unsuccessful, the network device may not send the feedback information.

After sending the uplink data, the terminal device can detect the feedback information within a time window. If the feedback information is not found within the time window, the terminal device no longer detects the feedback information, and may retransmits the uplink data later.

It should be understood that the behaviors of the terminal device and the network device described above are only exemplary implementations, and other implementations may also be used.

For example, the network device can always perform the channel listening without being limited by the time window; or, the network device can send the feedback information by a licensed frequency band; or, uplink resources are used, and specific downlink resources may be reserved for sending the feedback information, etc.

Alternatively, the terminal device may send timing information to the network device to indicate the timing relationship between the feedback information and the uplink data, the network device may send the feedback information based on the timing information, and the terminal device may receive the feedback information based on the timing relationship. Alternatively, the network device may send timing information to the terminal device to indicate the timing relationship between the feedback information and the uplink data, the network device sends the feedback information based on the timing relationship, and the terminal device may receive the feedback information based on the timing relationship.

It should be understood that embodiments of the present disclosure are described with the uplink data as an example, but it should be understood that embodiments of the present disclosure are not limited to this, and embodiments of the present disclosure can also be used for transmission of downlink data, that is, the uplink data can be replaced with downlink data. For the sake of brevity, details are omitted here.

In embodiments of the present disclosure, the uplink data and the transmission information are carried in a Physical Uplink Shared Channel (PUSCH). In the PUSCH, the portion for carrying the transmission information can be referred to as Uplink Control Information (UCI).

In some other embodiments of the present disclosure, the uplink data and transmission information may be carried on the PUSCH and the Physical Uplink Control Channel (PUCCH) respectively, which is not specifically limited in embodiments of the present disclosure.

In embodiments of the present disclosure, each transmission of the uplink data includes: a single Transport Block (TB); or, a single Coding Block Group (CBG); or, multiple TBs or CBGs corresponding to multiple streams; or, multiple TBs or CBGs corresponding to a same time domain location.

In the case that a single transmission of the uplink data includes multiple TBs or multiple CBGs, for each TB or CBG, the transmission information (for example, the serial number) for this transmission of the uplink data may be carried. Under such condition, the transmission information (for example, the serial number) for the multiple TBs or CBGs can be the same. The transmission information for each TB or CBG may be surrounded or half surrounded by the TB or CBG on time-frequency resources.

For example, as shown in FIG. 4, if three TBs or CBGs are sent at one time domain location, the transmission information (carried by UCI) can be sent three times, and the transmission information for each transmission is surrounded by a corresponding TB or CBG. The slash shaded part represents the uplink data.

Or, in the case that a single transmission of the uplink data includes multiple TBs or multiple CBGs, the transmission information (for example, the serial number) can be sent one time for the multiple TBs or CBGs. The transmission information can be surrounded or half surrounded by one of the TBs or CBGs.

Figure 5:
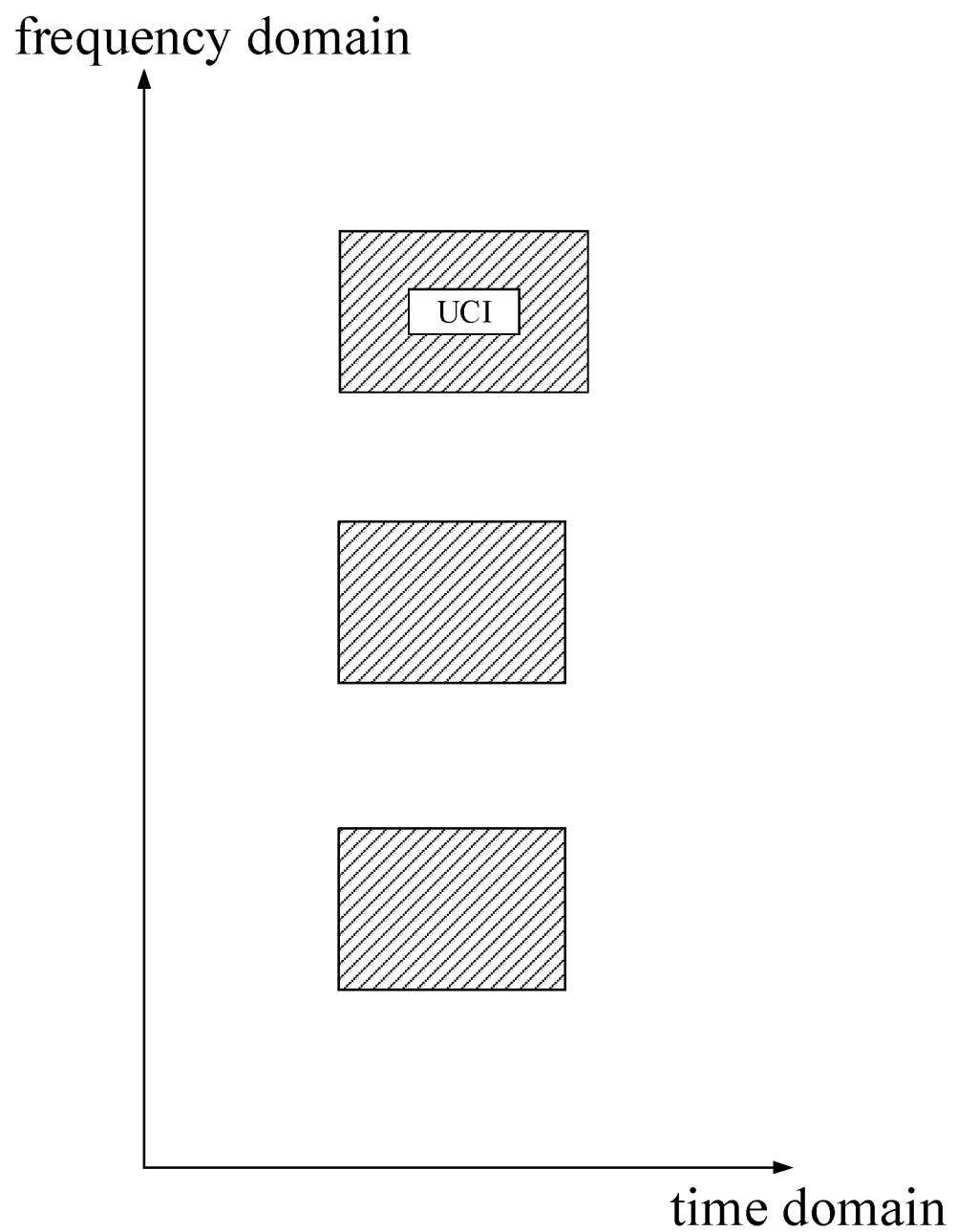
FIG. 5 is a schematic diagram showing sending of uplink data transmission information according to an embodiment of the present disclosure.

For example, as shown in FIG. 5, if three TBs or CBGs are sent at one time domain location, the transmission information (carried by UCI) can be sent one time, and the transmission information is surrounded by one TB or CBG. The slash shaded part represents the uplink data.

It should be understood that although it is described above that multiple TBs or CBGs corresponding to the same time domain location can be used as the uplink data for one transmission, it should be understood that embodiments of the present disclosure are not limited to this.

For example, the uplink data being sent for multiple times on a same time domain location and multiple frequency domain locations can be understood as multiple uplink transmissions, where each frequency domain location corresponds to one uplink transmission. According to embodiments, the multiple frequency domain locations belong to different BWPs or different subbands, respectively. This can mean that the uplink transmission on the same BWP or subband at the same time domain location can be referred to as one uplink transmission. One BWP or subband can be used to transmit one TB or CBG or multiple TBs or CBGs.

For another example, uplink data sent through multiple streams at the same time domain location can be understood as multiple uplink transmissions, where each stream corresponds to one uplink transmission. One stream can be used to transmit one TB or CBG or multiple TBs or CBGs.

In embodiments of the present disclosure, when each uplink transmission includes multiple TBs or CBGs, each TB or CBG of the multiple TBs or CBGs may have feedback information; if one TB or CBG is not received or successfully received, Negative ACKnowledgment (NACK) information (or Discontinuous Transmission (DTX); the following embodiments of the present disclosure take NACK as an example) can be fed back; and for other TBs or CBGs, ACKnowledgment (ACK) information can be fed back. Alternatively, for the multiple TBs or CBGs, only one piece of feedback information is provided. For example, if the multiple TBs or CBGs are successfully received, then ACK information can be fed back; or, if only one TB or CBG among the multiple TBs or CBGs is not received or successfully received, the NACK information can be fed back. For another example, if more than one TB or CBG in the multiple TBs or CBGs is successfully received, the ACK information can be fed back; if none of the TBs or CBGs is received or successfully received, the NACK information can be fed back.

In embodiments of the present disclosure, the serial number of transmission of the uplink data is used to indicate which time the uplink data is transmitted in the at least one uplink data transmission.

Figure 6:
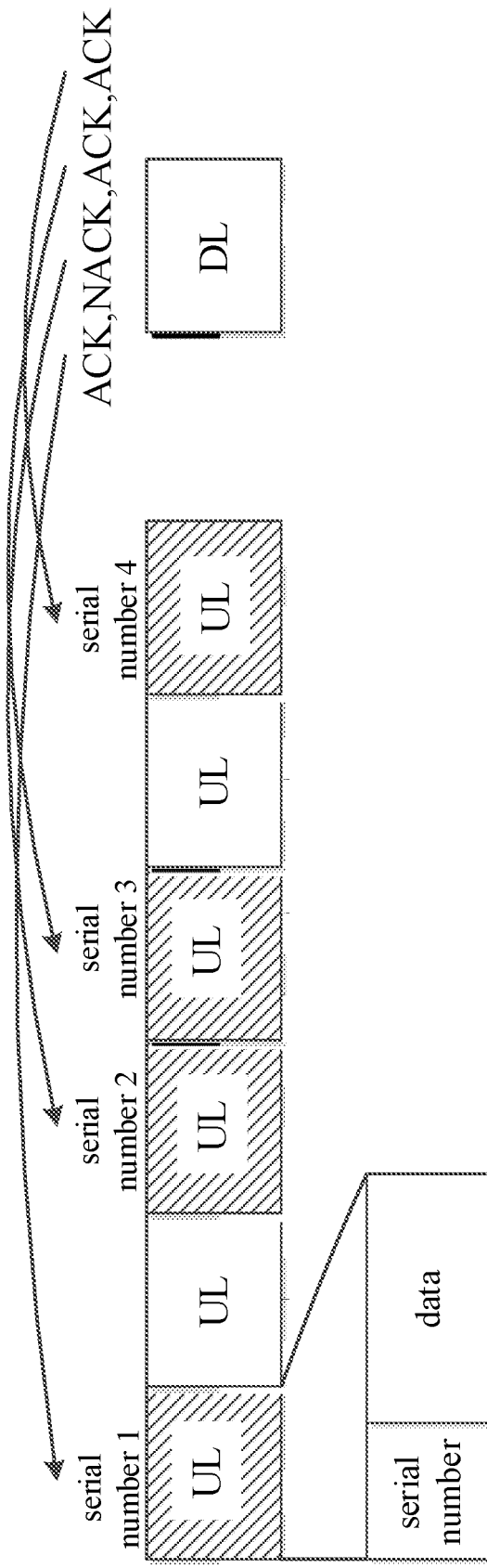
FIG. 6 is a schematic diagram showing uplink (UL) transmission and downlink (DL) feedback according to an embodiment of the present disclosure.
Figure 7:
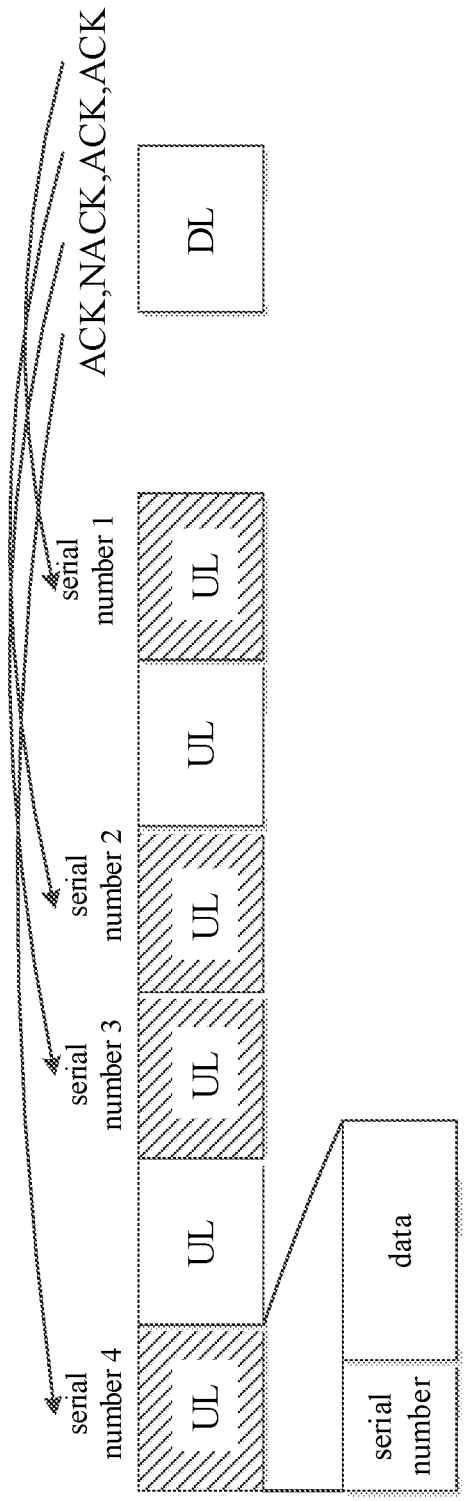
FIG. 7 is a schematic diagram showing uplink transmission and downlink feedback according to an embodiment of the present disclosure.

The serial number of transmission of the uplink data in embodiments of the present disclosure may be arranged from the smallest number to the largest number, for example, as shown in FIG. 6, or may be arranged from the largest number to the smallest number, for example, as shown in FIG. 7.

The step of the serial numbers for the uplink data can be constant. For example, as shown in FIGS. 6 and 7, the serial numbers for the uplink data can be incremented or decremented by 1.

The serial number can also be called an index, an uplink number, and so on.

According to embodiments, when the uplink data is sent at the same time domain location for many times, the number of times the uplink data has currently been transmitted included in the transmission information corresponding to the uplink data at the location may be a sum of the number of many times at the location and the number of times the uplink data was sent at this location.

Figure 8:
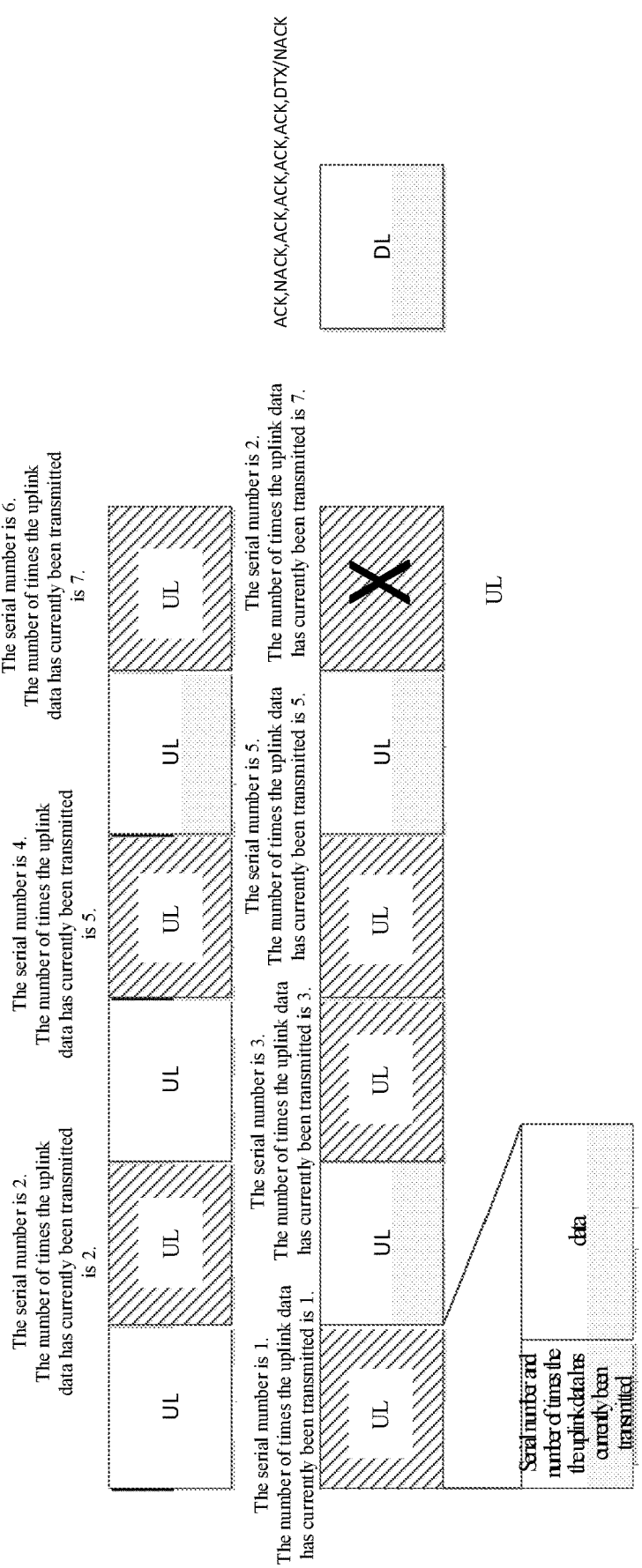
FIG. 8 is a schematic diagram showing uplink transmission and downlink feedback according to an embodiment of the present disclosure.

For example, as shown in FIG. 8, at the fourth time domain location, the uplink data is transmitted the fourth time and the fifth time, the number of times the uplink data has currently been transmitted in the transmission information corresponding to the fourth transmission of the uplink data and the fifth transmission of the uplink is 5.

It should be understood that in the above embodiments, the total number of the at least one transmission (i.e., the total number of times for transmitting the uplink data) is carried in the transmission information for each transmission of the uplink data, and however embodiments of the present disclosure are not limited to this, and the total number of the at least transmission can be carried in a part of the at least one transmission of the uplink data. Alternatively, the total number of the at least one transmission can be sent separately. In this case, the terminal device can first send the total number of the at least one transmission to the network device, and after receiving a feedback, the terminal device can perform at least one transmission of the uplink data.

It should also be understood that, in addition to the serial number of each transmission of the uplink data, the total number of times for transmitting the uplink data, and the number of times the uplink data has currently been transmitted, the transmission information for the uplink data may further include other information, for example, the HARQ process number of the uplink data, and so on.

In embodiments of the present disclosure, the terminal device may, based on a maximum number of times the terminal device can send the uplink data, determine at least one of the following: the total number of times for transmitting the uplink data, a bit setting of the serial number of each transmission of the uplink data, a bit setting of the total number of times for transmitting the uplink data, and a bit setting of the number of times the uplink data has currently been transmitted.

Correspondingly, the network device may, based on the maximum number of times the terminal device can send the uplink data, determine at least one of the following: the total number of times for transmitting the uplink data, a bit setting of the serial number of each transmission of the uplink data, a bit setting of the total number of times for transmitting the uplink data, and a bit setting of the number of times the uplink data has currently been transmitted.

Specifically, the terminal device determines the number of times the uplink data is transmitted based on the maximum number of times the terminal device is allowed to send the uplink data, which can prevent the number of times the uplink data is transmitted from exceeding the capability of the terminal device or increasing the network burden.

Further, the terminal device determines the bit setting of the serial number of each transmission of the uplink data, the bit setting of the total number of times for transmitting the uplink data, and the bit setting of the number of times the uplink data has currently been transmitted based on the maximum number of times the terminal device can send the uplink data, and this can ensure that the network device can demodulate the transmission information correctly. This is because the number of times the uplink data is actually transmitted by the terminal device is unknown to the network device, and if the terminal device sets bits of the transmission information based on the maximum number of times the terminal device can send the uplink data, it can be ensured that the network device can correctly know the transmission information.

The bit setting mentioned here may be the length of the bits. For example, assuming that the maximum number of times the terminal device can send the uplink data is 8, then the serial number of each transmission of the uplink data, the total number of times for transmitting the uplink data, or the number of times the uplink data has currently been transmitted can be characterized by 3 bits.

The maximum number of times the terminal device can send the uplink data may be configured by the network device.

For example, the terminal device receives second information sent by the network device, and the second information is used to indicate the maximum number of times the terminal device can send uplink data.

According to embodiments, the second information may be carried in dynamic signaling.

According to embodiment, the second information is carried in Radio Resource Control (RRC) signaling or Media Access Control (MAC) signaling.

It should be understood that the maximum number of times the terminal device can send uplink data may also be pre-configured based on a protocol.

According to embodiments, the maximum number of times the terminal device can send uplink data may be equal to the maximum number of times the network device can provide feedback for the uplink data, or may not be equal to the maximum number of times the network device can provide feedback for the uplink data.

In embodiments of the present disclosure, the network device may determine whether receiving of the uplink data transmitted at least one time is completed according to the total number of the at least one transmission of the uplink data.

Specifically, the terminal device may carry the total number of the at least one transmission of the uplink data and the serial number of each transmission of the uplink data in each transmission of the uplink data. In this case, the network device can determine whether receiving of the uplink data is completed based on the serial numbers of the transmissions of the received uplink data and the total number of the at least one transmission of the uplink data. If the network device determines that receiving of the uplink data is completed, the network device sends a feedback message including feedback information for the at least one transmission of the uplink data.

For example, assuming that the total number of transmissions of the uplink data is seven times, if the serial numbers of transmissions of the received uplink data are from 1 to 7, then it can be considered that the receiving of the uplink data is completed; if the serial numbers of transmissions of the received uplink data are from 1 to 6, then it can be considered that receiving of the uplink data is not completed.

In embodiments of the present disclosure, the network device, based on the total number of times for transmitting the uplink data or the number of times the uplink data has currently been transmitted and based on a serial number of a transmission of the uplink data which has currently been received, determine uplink data which is lost.

In one implementation, the terminal device can carry the total number of times for transmitting the uplink data and the serial number of each transmission of the uplink data in the transmission information for each transmission of the uplink data. The network device can determine which uplink data is lost based on the serial numbers of transmissions of the uplink data which has been received and the total number of times for transmitting the uplink data.

Specifically, assuming that the serial numbers of the transmissions of the uplink data are arranged from the smallest number to the largest number, the total number of times for transmitting the uplink data can be used to determine whether the uplink data which is transmitted the last time is lost.

Figure 9:
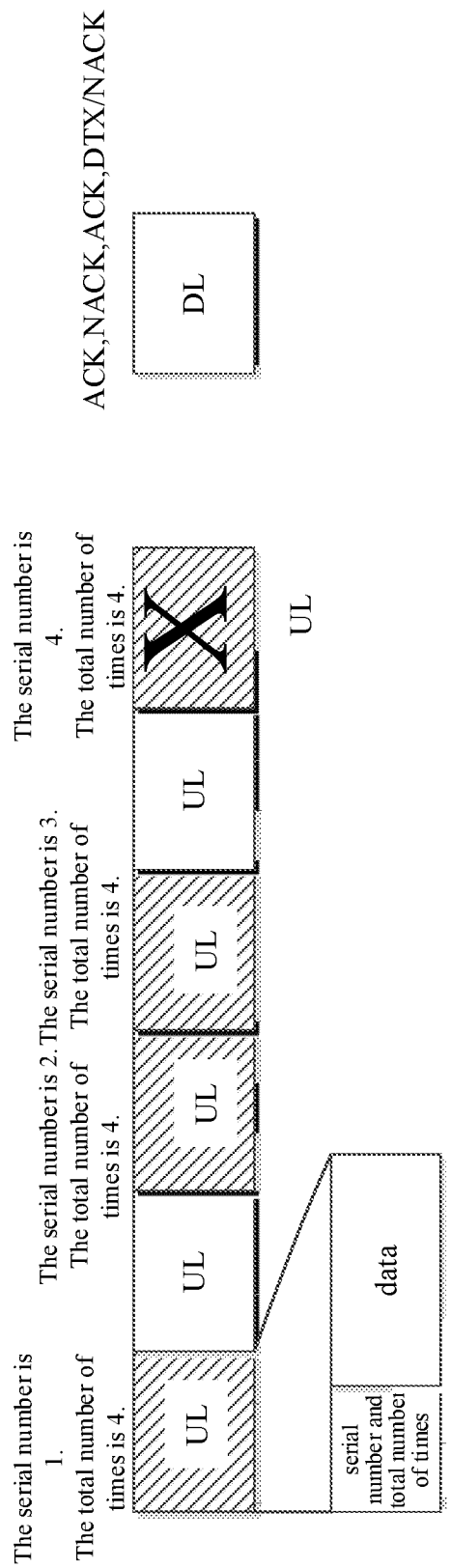
FIG. 9 is a schematic diagram showing uplink transmission and downlink feedback according to an embodiment of the present disclosure.

For example, as shown in FIG. 9, the serial numbers for the uplink data are arranged from the smallest number to the largest number, for example, there are numbers 1 to 4, and the total number of times is four times. If the uplink data which is transmitted the fourth time is lost, it can be determined that the uplink data which is transmitted the last time is lost based on the total number of times.

Or, assuming that the serial numbers for the uplink data are arranged from the largest number to the smallest number, the total number of times for transmitting the uplink data can be used to determine whether the uplink data which is transmitted the first time is lost.

For example, there are serial numbers for the uplink data 7 to 1 which are arranged from the largest number to the smallest number, and the total number of times is seven times. If the uplink data (the serial number for the transmission of the uplink data is 7) which is transmitted the first time is lost, it can be determined that the uplink data which is transmitted the first time is lost based on the total number of times.

In this implementation, the serial numbers for the uplink data can be arranged with a predetermined step, and the serial numbers for the uplink data can be arranged from the smallest number to the largest number or from the largest number to the smallest number. In this case, whether the uplink data which is transmitted in the middle of the at least one transmission is lost can be determined based on the serial numbers for the uplink data.

For example, the serial number arrangement can be from 1 to N with a step of 1. Based on this, whether the uplink data which is transmitted in the middle of the at least one transmission is lost can be determined. For example, if the serial numbers for the received uplink data are 1, 2, 4 and 5, it can be determined that the uplink data which is transmitted the third time is lost, and NACK information can be fed back.

It should be understood that, in some other embodiments of the present disclosure, the total number of times for transmitting the uplink data may not be reported to the network. The network device can directly determine whether there is data loss based on the serial numbers of transmissions of the uplink data, and specifically determine whether the uplink data which is transmitted in the middle of the at least one transmission is lost.

In another implementation, the terminal device can carry the number of uplink data transmissions that have occurred and the serial number of each transmission of the uplink data in the transmission information for each transmission of the uplink data. The network device can determine which uplink data is lost according to the serial numbers of transmissions of the uplink data which has been received and the number of times uplink data transmissions have occurred.

For example, the network device has received the uplink data five times, the number of uplink data transmissions that have occurred carried in the last received uplink data is 6 times, and the number of uplink data transmissions that have occurred carried in the previously received uplink data is four times, and it can be determined that the uplink data which is transmitted the fifth time is lost.

For example, as shown in FIG. 8, the network device has the uplink data six times, and the number of uplink data transmissions that have occurred carried in the last received uplink data is seven times, and then it can be determined that the uplink data which is transmitted the seventh time is lost.

In this case, the serial numbers of transmission of the uplink data may not be arranged in order. According to some other embodiments, the serial numbers of the transmissions of the uplink data may be arranged in order, which is not specifically limited in embodiments of the present disclosure.

In embodiments of the present disclosure, the network device may send the feedback information for each transmission of the uplink data according to the serial number of each transmission of the uplink data.

Correspondingly, the terminal device can obtain the feedback information for each transmission of the uplink data according to the serial number of each transmission of the uplink data.

In an implementation, according to the serial number of each transmission of the uplink data, the network device determines a bit position of the feedback information for each transmission of the uplink data in a feedback message, wherein the feedback message includes feedback information for the at least one transmission of the uplink data; the network device carries the feedback information for each transmission of the uplink data at the bit position; and sends the feedback message.

Correspondingly, according to the serial number of each transmission of the uplink data, from a received feedback message, the terminal device determines a bit position of the feedback information for each transmission of the uplink data in the feedback message, wherein the feedback message includes feedback information for all or part of the at least one transmission of the uplink data. Based on the bit position, the terminal device obtains the feedback information for each transmission of the uplink data from the feedback message.

The feedback message may carry feedback information for the at least one transmission of the uplink data. In the at least one transmission of the uplink data, some data may be successfully received by the network device (the corresponding feedback information may be ACK), and some other data may not be successfully received by the network device or some other data may be determined by the network device as being lost (the corresponding feedback information may be DTX/NACK).

The bit position of the feedback information for each transmission of the uplink data in the feedback message can be determined based on the serial number for each transmission of the uplink data. For example, for the transmission of the uplink data numbered 1, the feedback information may be at the first bit position; for the transmission of the uplink data numbered 2, the feedback information may be at the second bit position; for the transmission of the uplink data numbered 3, the feedback information may be at the third bit position, and so on.

It should be understood that in the feedback message, the bit position corresponding to a single transmission of the uplink data may include one or more bits.

For example, when a single transmission of the uplink data includes multiple TBs or CBGs, the bit position corresponding to the single transmission of the uplink data may include multiple bits each of which corresponds to a TB or CBG. The position corresponding to each TB or CBG in the multiple bits corresponding to this single transmission of the uplink data may be configured by the network device, or may be preset by a protocol.

According to some other embodiments, even if a single transmission of the uplink data includes multiple TBs or CBGs, the corresponding bit position in the feedback message may include only one bit. Embodiments of the present disclosure do not impose specific limitations on this.

In an implementation, the network device may determine a resource of the feedback information for each transmission of the uplink data according to the serial number of each transmission of the uplink data, and send the feedback information for each transmission of the uplink data on the determined resource.

Correspondingly, the terminal device can determine the resource of the feedback information for each transmission of the uplink data according to the serial number of each transmission of the uplink data, and obtain the feedback information for each transmission of the uplink data based on the resource of the feedback information for each transmission of the uplink data.

The resource mentioned here may be a code domain resource, and different code domain resources may be used for feedback for uplink data with different numbers.

For example, there may be a sequence that is used to indicate the feedback information for the transmission of the uplink data numbered 1, and there may be another sequence that is used to indicate the feedback information for the transmission of the uplink data numbered 2.

According to some other embodiments, the sequence mentioned here may also be a time domain resource or a frequency domain resource, which is not specifically limited in embodiments of the present disclosure.

In embodiments of the present disclosure, the network device may send feedback information based on the uplink data actually transmitted by the terminal device. That is, the uplink data corresponding to the feedback resources is determined by the actual number of uplink transmissions, and the feedback does not include the feedback for a uplink data transmission that has occurred. The feedback mode can be called as a dynamic feedback mode. In this case, the serial number of each transmission of the uplink data can be carried in the transmission information for the uplink data.

For example, as shown in FIGS. 6, 7, 8 and 9, the number of pieces of feedback information transmitted in the downlink can be equal to the number of uplink data transmissions.

In another implementation, the number of pieces of uplink data corresponding to a feedback resource used by the network device may be semi-statically configured, and the number may be greater than or equal to the actual number of uplink data transmissions. The feedback mode can be referred to as a semi-static feedback mode. In this case, the serial number of each transmission of the uplink data can be carried in the transmission information for the uplink data.

Figure 10:
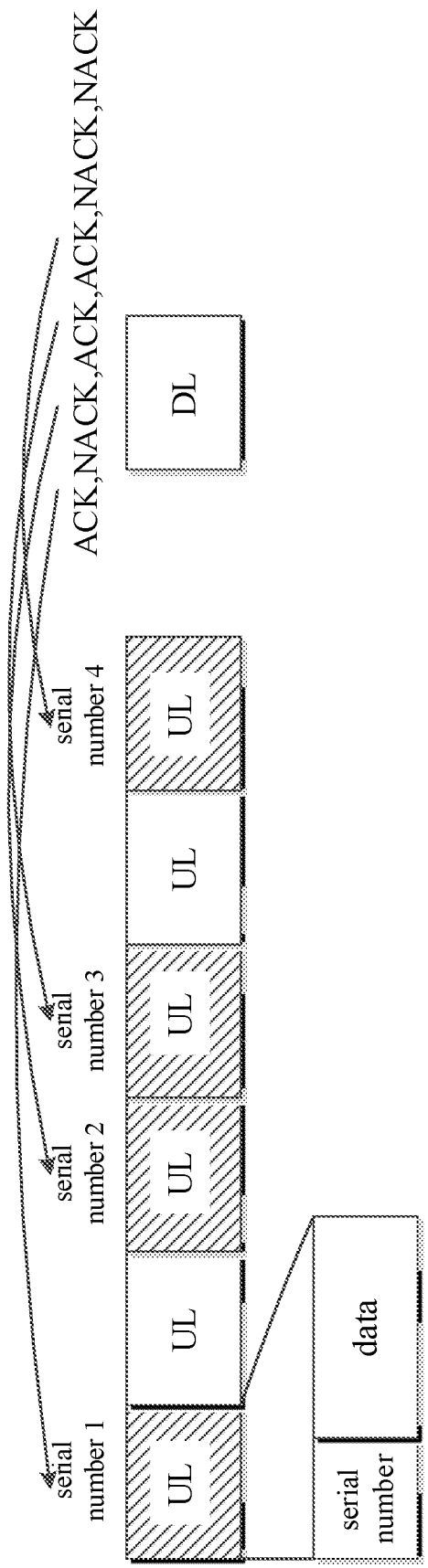
FIG. 10 is a schematic diagram showing uplink transmission and downlink feedback according to an embodiment of the present disclosure.

For example, as shown in FIG. 10, the number of pieces of downlink feedback information can be greater than the number of uplink data transmissions. Part of the feedback information can be called padding information (can be NACK) and does not correspond to any uplink data. That is, the last two NACKs shown in FIG. 10 are the padding information.

In yet another implementation, the number of pieces of uplink data corresponding to a feedback resource used by the network device may be determined based on the maximum number of available processes, and the number may be greater than or equal to the number of uplink data transmissions that actually occurred. This feedback mode can be referred to as a full codebook feedback mode. In this case, there may be no need to carry the serial number of each transmission of the uplink data in the transmission information for the uplink data.

In embodiments of the present disclosure, when the feedback mode is the dynamic feedback mode, the feedback message may only carry feedback information corresponding to the actually occurred uplink data transmissions, for example, as shown in FIGS. 6, 7, 8 and 9.

When the feedback mode is a semi-static feedback mode, the feedback message can carry feedback information corresponding to the actually occurred uplink data transmissions, and the extra bits can carry padding information. The feedback information corresponding to the uplink data transmissions that actually occurred in the feedback message can use a preset position of the feedback message, for example, it can use the first multiple consecutive bits of the feedback message (for example, as shown in FIG. 10), the last consecutive multiple bits, or, consecutive bits in the middle.

When the feedback mode is a full codebook feedback mode, the feedback message carries the feedback information for all of the maximum number of available processes. In this case, the feedback message needs to include multiple bits, and the arrangement of the feedback information in the feedback message may be determined based on the process number.

In embodiments of the present disclosure, when feedback information for the at least one transmission of the uplink data is carried in the same feedback message, the resources of the feedback message (for example, time domain resources, frequency domain resources and/or code domain resources) may be determined based on the total number of times for transmitting the uplink data or a preset length of the feedback message.

For example, when the feedback mode is a dynamic feedback mode, the feedback message may only carry feedback information for uplink data transmissions that actually occurred. In this case, the resources of the feedback message may be determined based on the total number of times for transmitting the uplink data.

For another example, when the feedback mode is a semi-static feedback mode, the feedback message may carry feedback information for uplink data transmissions that actually occurred and padding information. The length of the feedback message may be a preset length, and in this case, the resources of the feedback message may be determined based on preset length.

In embodiments of the present disclosure, when the feedback information for the at least one transmission of the uplink data is carried in the same feedback message, the length of the feedback message (for example, time domain resources, frequency domain resources, and/or code domain resources) may be determined based on the total number of times for transmitting the uplink data or the preset length of the feedback message.

After the length of the feedback message is determined, the resources for the feedback message can be determined based on the length.

In embodiments of the present disclosure, the network device may configure the feedback mode for the terminal device.

For example, the terminal device receives first information sent by the network device, and the first information is used to indicate a feedback mode of the network device for the uplink data, and the feedback mode indicates that a resource of the feedback message for the uplink data and/or a bit setting of the feedback message is determined based on actually transmitted uplink data. In this case, the feedback mode may be the above-mentioned dynamic feedback mode or semi-static feedback mode.

According to embodiments, the first information may be carried in dynamic signaling.

According to embodiments, the first information is carried in RRC signaling or MAC signaling.

Alternatively, the feedback mode can also be preset on the terminal device based on a protocol.

Therefore, in embodiments of the present disclosure, when the terminal device sends uplink data, at least one of a serial number of each transmission of the uplink data, a total number of times for transmitting the uplink data, and a number of times the uplink data has currently been transmitted is sent, so as to better provide feedback information, and accordingly improve communication performance.

Figure 11:
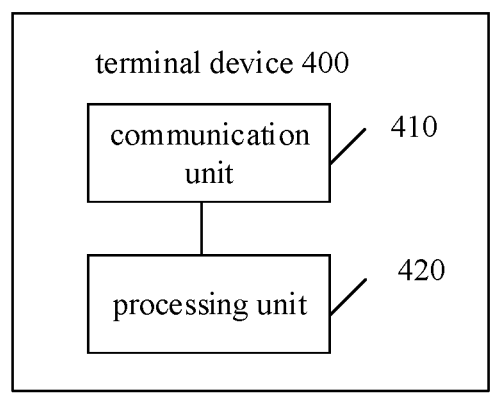
FIG. 11 is a schematic block diagram of a terminal device according to an embodiment of the present disclosure.

FIG. 11 is a schematic block diagram of a terminal device 400 according to an embodiment of the present disclosure. The terminal device 400 may include a communication unit 410 and a processing unit 420.

The communication unit 410 is configured to transmit uplink data at least one time, and for each transmission of the uplink data among at least one transmission of the uplink data, transmit transmission information for each transmission of the uplink data, wherein the transmission information for each transmission of the uplink data includes at least one of the following:

a serial number of each transmission of the uplink data, a total number of times for transmitting the uplink data, and a number of times the uplink data has currently been transmitted among at least one transmission of the uplink data.

According to embodiments, the communication unit 410 is further configured to:

listen channel on an unlicensed frequency band; and if the channel is listened, transmit the uplink data at least time on the unlicensed frequency band.

According to embodiments, each transmission of the uplink data includes: a single Transport Block (TB); or, a single Coding Block Group (CBG); or, multiple TBs or CBGs corresponding to multiple streams; or, multiple TBs or CBGs corresponding to a single time domain location.

According to embodiments, the communication unit 410 is further configured to:

obtain feedback information sent by a network device for the uplink data.

According to embodiments, the communication unit 410 is further configured to:

obtain the feedback information for each transmission of the uplink data according to the serial number of each transmission of the uplink data.

According to embodiments, the processing unit 420 is configured to, according to the serial number of each transmission of the uplink data, from a received feedback message, determine a bit position of the feedback information for each transmission of the uplink data in the feedback message, wherein the feedback message includes feedback information for all or part of the at least one transmission of the uplink data;

the communication unit 410 is configured to, based on the bit position, obtain the feedback information for each transmission of the uplink data from the feedback message.

According to embodiments, the processing unit 420 is configured to determine a resource for receiving the feedback message according to the total number of times for transmitting the uplink data or a preset length of the feedback message, wherein the feedback message includes feedback information for all or part of the at least one transmission of the uplink data;

the communication unit 410 is further configured to receive the feedback message on the determined resource.

According to embodiments, when the feedback message has a preset length, the feedback information for the uplink data is located at a preset position in the feedback message, and other positions are filled with a padding signal.

According to embodiments, the processing unit 420 is configured to determine a code domain resource of the feedback information for each transmission of the uplink data according to the serial number of each transmission of the uplink data; and the communication unit 410 is configured to obtain the feedback information for each transmission of the uplink data based on the code domain resource for the feedback information for each transmission of the uplink data.

According to embodiments, the communication unit 410 is further configured to:

receive first information sent by a network device, wherein the first information is used to indicate a feedback mode of the network device for the uplink data, and the feedback mode indicates that a resource of the feedback message for the uplink data and/or a bit setting of the feedback message is determined based on actually transmitted uplink data.

According to embodiments, the first information is carried in Radio Resource Control (RRC) signaling or Medium Access Control (MAC) signaling.

According to embodiments, the processing unit 420 is configured to, based on a maximum number of times the terminal device can send the uplink data, determine at least one of the following:

the total number of times for transmitting the uplink data, a bit setting of the serial number of each transmission of the uplink data, a bit setting of the total number of times for transmitting the uplink data, and a bit setting of the number of times the uplink data has currently been transmitted.

According to embodiments, the communication unit 410 is further configured to:

receive second information sent by a network device, wherein the second information is used to indicate the maximum number of times the terminal device can send the uplink data.

According to embodiments, at least one location in a time domain is for the at least one transmission of the uplink data.

According to embodiments, the uplink data is sent for multiple times on a same time domain location and multiple frequency domain locations.

According to embodiments, the multiple frequency domain locations belong to different Bandwidth Parts (BWPs) or different subbands, respectively.

According to embodiments, the uplink data and the transmission information are carried in a Physical Uplink Shared Channel (PUSCH).

It should be understood that the terminal device 400 may be used to implement various operations implemented by the terminal device in the method embodiments of the present disclosure, and for the sake of brevity, details are not described herein again.

Figure 12:
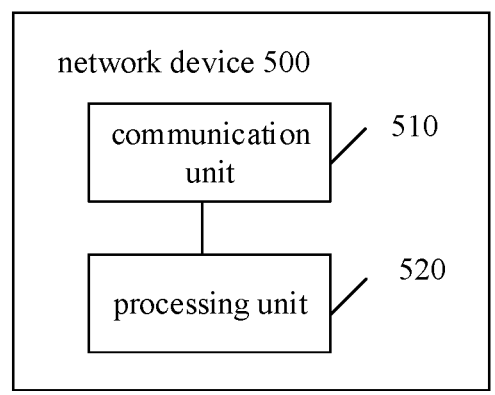
FIG. 12 is a schematic block diagram of a network device according to an embodiment of the present disclosure.

FIG. 12 is a schematic block diagram of a network device 500 according to an embodiment of the present disclosure. The network device 500 may include a communication unit 510 and may optionally include a processing unit 420.

The communication unit 510 is configured to:

receive uplink data sent from a terminal device at least one time, and transmission information for each transmission of the uplink data sent from the terminal device for each transmission of the uplink data among at least one transmission of the uplink data, wherein the transmission information for each transmission of the uplink data includes at least one of the following:

a serial number of each transmission of the uplink data, a total number of times for transmitting the uplink data, and a number of times the uplink data has currently been transmitted; and based on the transmission information for each transmission of the uplink data, send feedback information for the uplink data to the terminal device.

According to embodiments, the uplink data transmitted at least one time and the transmission information are carried on an unlicensed frequency band.

According to embodiments, each transmission of the uplink data includes: a single Transport Block (TB); or, a single Coding Block Group (CBG); or, multiple TBs or CBGs corresponding to multiple streams; or, multiple TBs or CBGs corresponding to a single time domain location.

According to embodiments, the processing unit 520 is configured to determine whether receiving of the uplink data transmitted at least one time is completed according to the total number of times for transmitting the uplink data.

According to embodiments, the processing unit 520 is configured to, based on the total number of times for transmitting the uplink data or a number of times the uplink data has currently been transmitted, and based on a serial number of a transmission of the uplink data which has currently been received, determine uplink data which is lost.

According to embodiments, the communication unit 510 is further configured to:

send the feedback information for each transmission of the uplink data according to the serial number of each transmission of the uplink data.

According to embodiments, the processing unit 520 is configured to, according to the serial number of each transmission of the uplink data, determine a bit position of the feedback information for each transmission of the uplink data in a feedback message, wherein the feedback message includes feedback information for the at least one transmission of the uplink data; and carry the feedback information for each transmission of the uplink data at the bit position;

the communication unit 510 is further configured to send the feedback message.

According to embodiments, the processing unit 520 is configured to determine a resource for sending the feedback message according to the total number of times for transmitting the uplink data or a preset length of the feedback message, wherein the feedback message includes feedback information for the at least one transmission of the uplink data;

the communication unit 510 is further configured to send the feedback message on the determined resource.

According to embodiments, when the feedback message has a preset length, the feedback information for the uplink data is located at a preset position in the feedback message, and other positions are filled with a padding signal.

According to embodiments, the processing unit 520 is configured to determine a code domain resource of the feedback information for each transmission of the uplink data according to the serial number of each transmission of the uplink data;

the communication unit 510 is further configured to send the feedback information for each transmission of the uplink data based on the determined code domain resource.

According to embodiments, the communication unit 510 is further configured to:

send first information to the terminal device, wherein the first information is used to indicate a feedback mode of the network device for the uplink data, and the feedback mode indicates that a resource of the feedback message for the uplink data and/or a bit setting of the feedback message is determined based on actually transmitted uplink data.

According to embodiments, the first information is carried in RRC signaling or MAC signaling.

According to embodiments, the processing unit 520 is configured to, based on a maximum number of times the terminal device can send the uplink data, determine at least one of the following:

the total number of times for transmitting the uplink data, a bit setting of the serial number of each transmission of the uplink data, a bit setting of the total number of times for transmitting the uplink data, and a bit setting of the number of times the uplink data has currently been transmitted.

According to embodiments, the communication unit 510 is further configured to:

send second information to the terminal device, wherein the second information is used to indicate the maximum number of times the terminal device can send the uplink data.

According to embodiments, at least one location in a time domain is for the at least one transmission of the uplink data.

According to embodiments, the uplink data is sent for multiple times on a same time domain location and multiple frequency domain locations.

According to embodiments, the multiple frequency domain locations belong to different Bandwidth Parts (BWPs) or different subbands, respectively.

According to embodiments, the uplink data and the transmission information are carried in a Physical Uplink Shared Channel (PUSCH).

It should be understood that the network device 500 may be used to implement various operations implemented by the network device in the method embodiments of the present disclosure, and for the sake of brevity, details are not described herein again.

Figure 13:
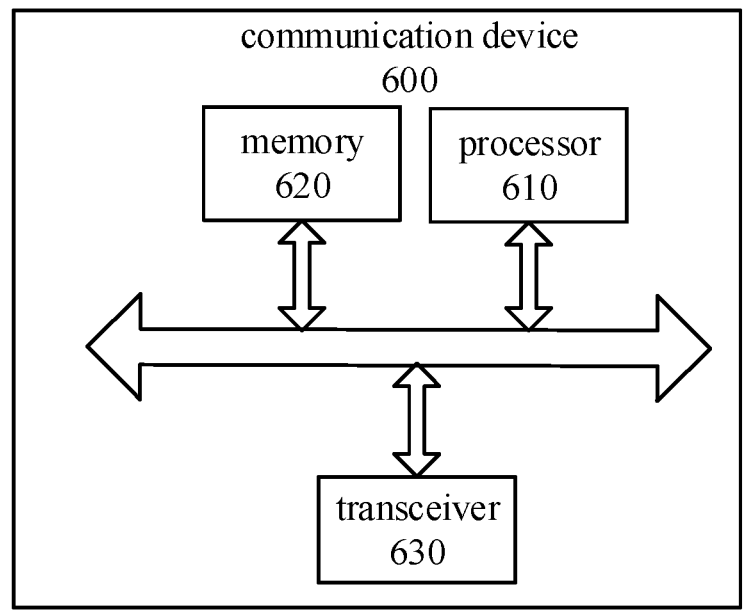
FIG. 13 is a schematic block diagram of a communication device according to an embodiment of the present disclosure.

FIG. 13 is a schematic structural diagram of a communication device 600 according to an embodiment of the present disclosure. The communication device 600 shown in FIG. 13 includes a processor 610, and the processor 610 may call and run a computer program from a memory to perform the method in embodiments of the present disclosure.

According to embodiments, as shown in FIG. 13, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 13, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the terminal device in embodiments of the present disclosure, and the communication device 600 may implement the corresponding processes implemented by the terminal device in the method embodiments of the present disclosure. For brevity, details are not repeated here.

According to embodiments, the communication device 600 may specifically be the network device according to an embodiment of the present disclosure, and the communication device 600 may implement the corresponding processes implemented by the network device in the method embodiments of the present disclosure. For brevity, details are not repeated here.

Figure 14:
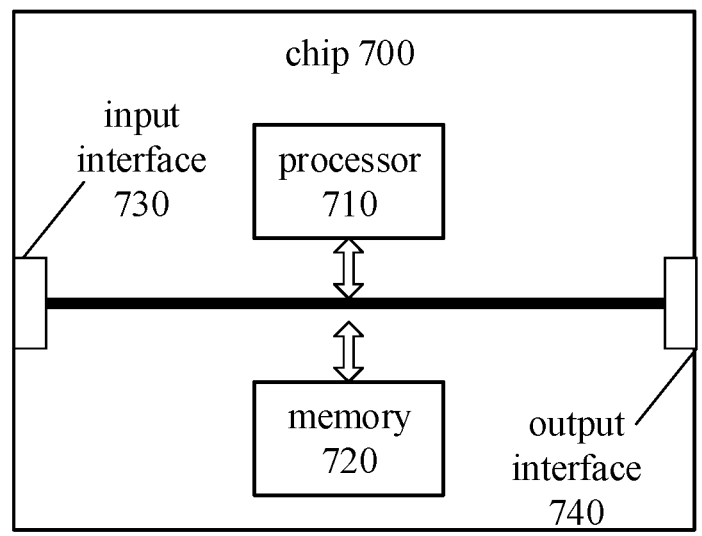
FIG. 14 is a schematic block diagram of a chip according to an embodiment of the present disclosure.

FIG. 14 is a schematic structural diagram of a chip according to an embodiment of the present disclosure. The chip 700 shown in FIG. 14 includes a processor 710, and the processor 710 can call and run a computer program from a memory to implement the method according to embodiments of the present disclosure.

According to embodiments, as shown in FIG. 14, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the terminal device in embodiments of the present disclosure, and the chip can implement the corresponding processes implemented by the terminal device in various methods according to embodiments of the present disclosure. For brevity, details are not repeated herein again.

According to embodiments, the chip can be applied to the network device in embodiments of the present disclosure, and the chip can implement the corresponding processes implemented by the network device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 15:
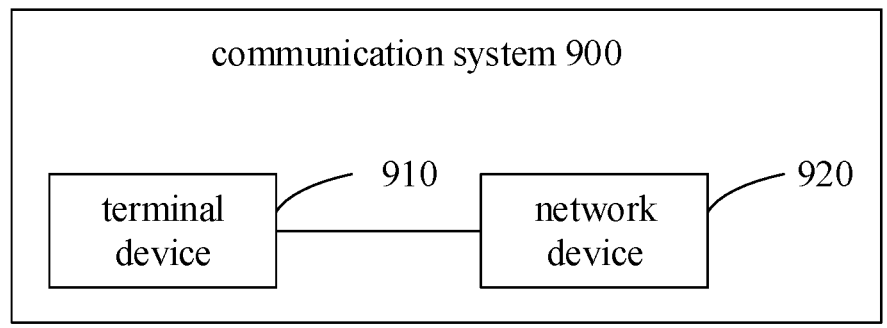
FIG. 15 is a schematic block diagram of a communication system according to an embodiment of the present disclosure.

FIG. 15 is a schematic block diagram of a communication system 900 according to an embodiment of the present disclosure. As shown in FIG. 15, the communication system 900 includes a terminal device 910 and a network device 920.

The terminal device 910 may be used to implement the corresponding functions implemented by the terminal device in the foregoing methods, and the network device 920 may be used to implement the corresponding functions implemented by the network device in the foregoing methods. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
   transmitting, by a terminal device, uplink data at least one time, and for each transmission of the uplink data among at least one transmission of the uplink data, transmitting transmission information for each transmission of the uplink data, wherein the transmission information for each transmission of the uplink data comprises at least one of the following:

a serial number of each transmission of the uplink data, a total number of times for transmitting the uplink data, and a number of times the uplink data has currently been transmitted among at least one transmission of the uplink data;

wherein the method further comprises:

obtaining, by the terminal device, feedback information sent by a network device for the uplink data;

wherein obtaining, by the terminal device, the feedback information sent by the network device for the uplink data comprises:

obtaining the feedback information for each transmission of the uplink data according to the serial number of each transmission of the uplink data.

2. The method according to claim 1, wherein the transmitting, by the terminal device, the uplink data at least one time comprises:

listening to a channel, by the terminal device, on an unlicensed frequency band; and if the channel is listened to, transmitting, by the terminal device, the uplink data at least one time on the unlicensed frequency band.

3. The method according to claim 1, wherein each transmission of the uplink data comprises: a single Transport Block (TB); or, a single Coding Block Group (CBG); or, multiple TBs or CBGs corresponding to multiple streams; or, multiple TBs or CBGs corresponding to a single time domain location.

4. The method according to claim 1, wherein the obtaining the feedback information for each transmission of the uplink data according to the serial number of each transmission of the uplink data comprises:

according to the serial number of each transmission of the uplink data, determining, from a received feedback message, a bit position of the feedback information for each transmission of the uplink data in the feedback message, wherein the feedback message comprises feedback information for all or part of the at least one transmission of the uplink data; and obtaining the feedback information for each transmission of the uplink data from the feedback message based on the bit position.

5. The method according to claim 1, further comprising:

receiving, by the terminal device, second information sent by a network device, wherein the second information is used to indicate a maximum number of times the terminal device can send the uplink data.

6. A wireless communication method, comprising:

receiving, by a network device, uplink data sent from a terminal device at least one time, and transmission information for each transmission of the uplink data sent from the terminal device, wherein the transmission information for each transmission of the uplink data comprises at least one of the following:

a serial number of each transmission of the uplink data, a total number of times for transmitting the uplink data, and a number of times the uplink data has currently been transmitted; and based on the transmission information for each transmission of the uplink data, sending, by the network device, feedback information for the uplink data to the terminal device, wherein sending, by the network device, the feedback information for the uplink data to the terminal device comprises:

sending the feedback information for each transmission of the uplink data according to the serial number of each transmission of the uplink data.

7. The method according to claim 6, wherein each transmission of the uplink data comprises: a single Transport Block (TB); or, a single Coding Block Group (CBG); or, multiple TBs or CBGs corresponding to multiple streams; or, multiple TBs or CBGs corresponding to a single time domain location.

8. The method according to claim 6, wherein the sending the feedback information for each transmission of the uplink data according to the serial number of each transmission of the uplink data comprises:

according to the serial number of each transmission of the uplink data, determining a bit position of the feedback information for each transmission of the uplink data in a feedback message, wherein the feedback message comprises feedback information for the at least one transmission of the uplink data; and carrying the feedback information for each transmission of the uplink data at the bit position; and sending the feedback message.

9. A terminal device, comprising:

a memory for storing computer programs;

a processor; and a transceiver;

wherein the processor is configured to execute the computer programs to control the transceiver to transmit uplink data at least one time, and for each transmission of the uplink data among at least one transmission of the uplink data, transmit transmission information for each transmission of the uplink data, wherein the transmission information for each transmission of the uplink data comprises at least one of the following:

a serial number of each transmission of the uplink data, a total number of times for transmitting the uplink data, and a number of times the uplink data has currently been transmitted among at least one transmission of the uplink data;

wherein the transceiver is further configured to:

obtain feedback information sent by a network device for the uplink data;

wherein the transceiver is further configured to:

obtain the feedback information for each transmission of the uplink data according to the serial number of each transmission of the uplink data.

10. The terminal device according to claim 9, wherein each transmission of the uplink data comprises: a single Transport Block (TB); or, a single Coding Block Group (CBG); or, multiple TBs or CBGs corresponding to multiple streams; or, multiple TBs or CBGs corresponding to a single time domain location.

11. The device according to claim 10, wherein the processor is further configured to, according to the serial number of each transmission of the uplink data, determine, from a received feedback message, a bit position of the feedback information for each transmission of the uplink data in the feedback message, wherein the feedback message comprises feedback information for all or part of the at least one transmission of the uplink data;

wherein the transceiver is configured to, obtain the feedback information for each transmission of the uplink data from the feedback message based on the bit position.

12. A network device, comprising:
a memory for storing computer programs;
a processor; and
a transceiver;
wherein the processor is configured to execute the computer programs to control the transceiver to receive uplink data sent from a terminal device at least one time, and transmission information for each transmission of the uplink data sent from the terminal device for each transmission of the uplink data among at least one transmission of the uplink data, wherein the transmission information for each transmission of the uplink data comprises at least one of the following:
a serial number of each transmission of the uplink data, a total number of times for transmitting the uplink data, and a number of times the uplink data has currently been transmitted; and
based on the transmission information for each transmission of the uplink data, send feedback information for the uplink data to the terminal device;
wherein the transceiver is further configured to:
send the feedback information for each transmission of the uplink data according to the serial number for each transmission of the uplink data.

13. The network device according to claim 12, wherein each transmission of the uplink data comprises: a single Transport Block (TB); or, a single Coding Block Group (CBG); or, multiple TBs or CBGs corresponding to multiple streams; or, multiple TBs or CBGs corresponding to a single time domain location.

14. The device according to claim 12, wherein the processor is further configured to, according to the serial number of each transmission of the uplink data, determine a bit position of the feedback information for each transmission of the uplink data in a feedback message, wherein the feedback message comprises feedback information for the at least one transmission of the uplink data; and carry the feedback information for each transmission of the uplink data at the bit position;
wherein the transceiver is further configured to send the feedback message.

15. The method according to claim 1, wherein obtaining the feedback information for each transmission of the uplink data according to the serial number of each transmission of the uplink data comprises:
determining a code domain resource of the feedback information for each transmission of the uplink data according to the serial number of each transmission of the uplink data; and
obtaining the feedback information for each transmission of the uplink data based on the code domain resource for the feedback information for each transmission of the uplink data.

16. The method according to claim 6, wherein sending the feedback information for each transmission of the uplink data according to the serial number of each transmission of the uplink data comprises:
determining a code domain resource of the feedback information for each transmission of the uplink data according to the serial number of each transmission of the uplink data; and
sending the feedback information for each transmission of the uplink data based on the determined code domain resource.

17. The device according to claim 9, wherein the processor is configured to:
determine a code domain resource of the feedback information for each transmission of the uplink data according to the serial number of each transmission of the uplink data; and
obtain the feedback information for each transmission of the uplink data based on the code domain resource for the feedback information for each transmission of the uplink data.

18. The device according to claim 12, wherein the processor is configured to:
determine a code domain resource of the feedback information for each transmission of the uplink data according to the serial number of each transmission of the uplink data; and
Sending the feedback information for each transmission of the uplink data based on the determined code domain resource.

* * * * *